United States Patent [19]
Wielhouwer

[11] Patent Number: 5,729,321
[45] Date of Patent: Mar. 17, 1998

[54] COMBINED SUNGLASSES AND SUNSHIELD

[76] Inventor: Linda F. Wielhouwer, 100 Teggerdine, White Lake, Mich. 48386

[21] Appl. No.: 662,800

[22] Filed: Jun. 12, 1996

[51] Int. Cl.[6] .............................. G02C 7/10; G02C 9/00; E03D 11/00
[52] U.S. Cl. .............................. 351/44; 351/47; 351/158; 2/431; 2/453
[58] Field of Search .................................. 351/41, 44, 46, 351/47, 158; 2/12, 13, 431, 433, 452, 453

[56] References Cited

U.S. PATENT DOCUMENTS

D. 354,974  1/1995  Wielhouwer .......................... D16/301
2,634,416  4/1953  Fehrs .......................... 351/44
3,944,344  3/1976  Wichers .......................... 351/41

Primary Examiner—Huy Mai
Attorney, Agent, or Firm—Alex Rhodes

[57] ABSTRACT

A pair sunglasses for preventing injury from the intense rays of the sun has a generally rectangular tinted transparent panel and a generally rectangular opaque sunshield rotatably mounted to a slender resilient headband which supports the sunglasses on a forehead of a user. When the tinted transparent and opaque sunshields are both in vertical or horizontal positions, the opaque sunshield is in covering relationship to the tinted transparent panel. In a second aspect of the invention, a generally rectangular tinted transparent panel is mounted for rotation on an opaque sunshield which is mounted for rotation on a slender resilient headband.

10 Claims, 5 Drawing Sheets

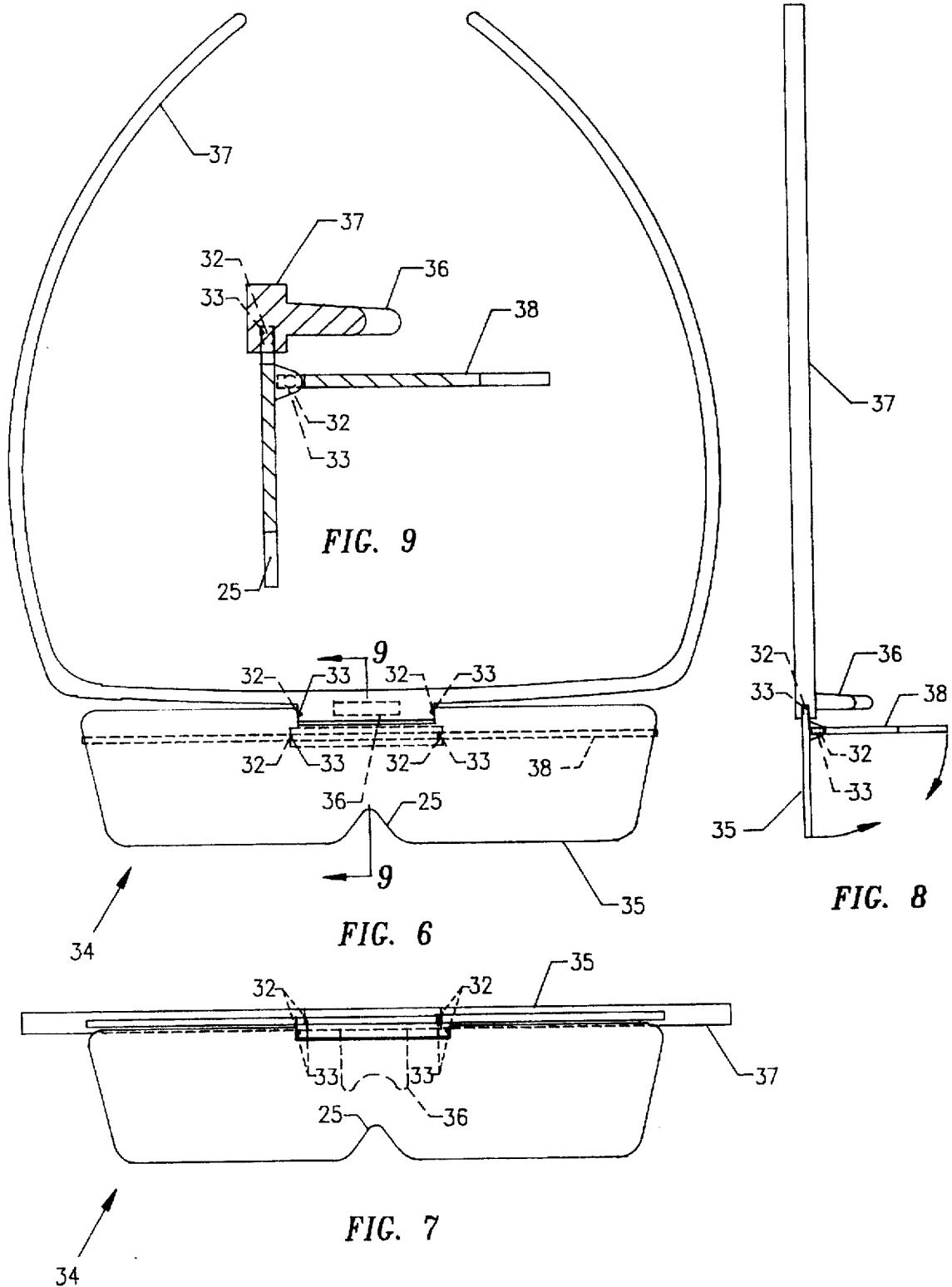

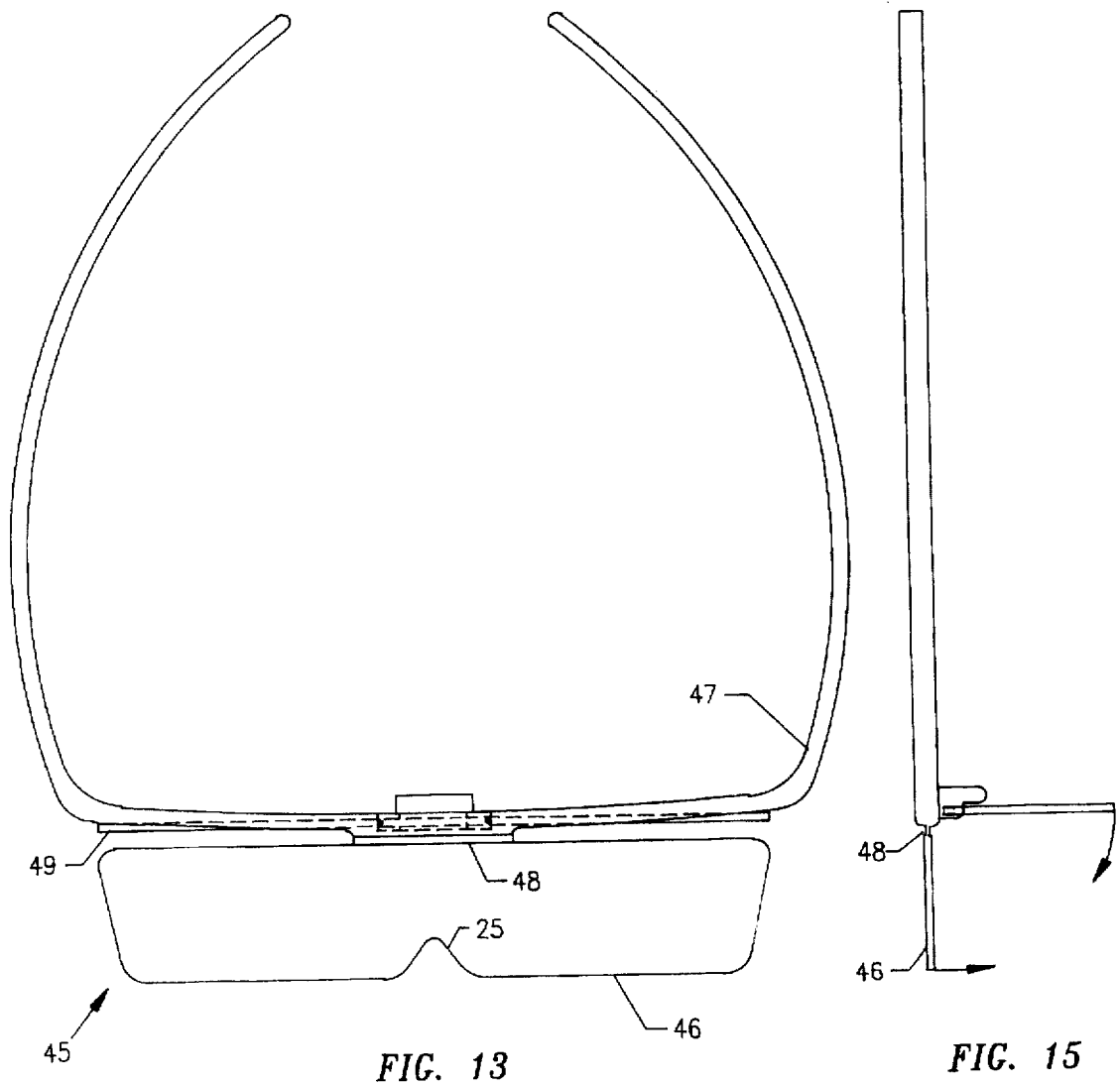
FIG. 13
FIG. 15
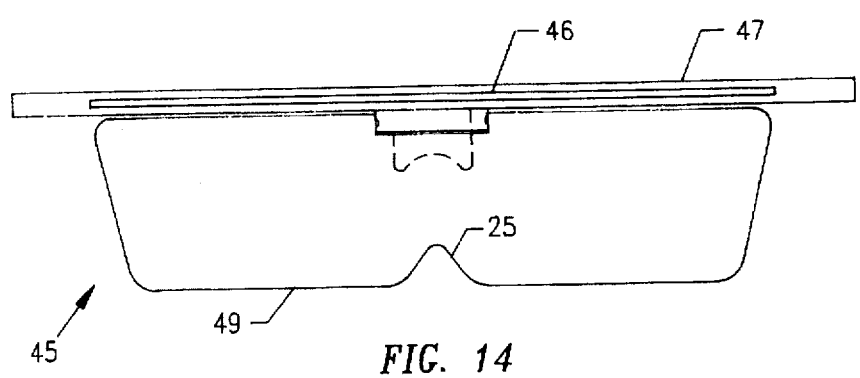
FIG. 14

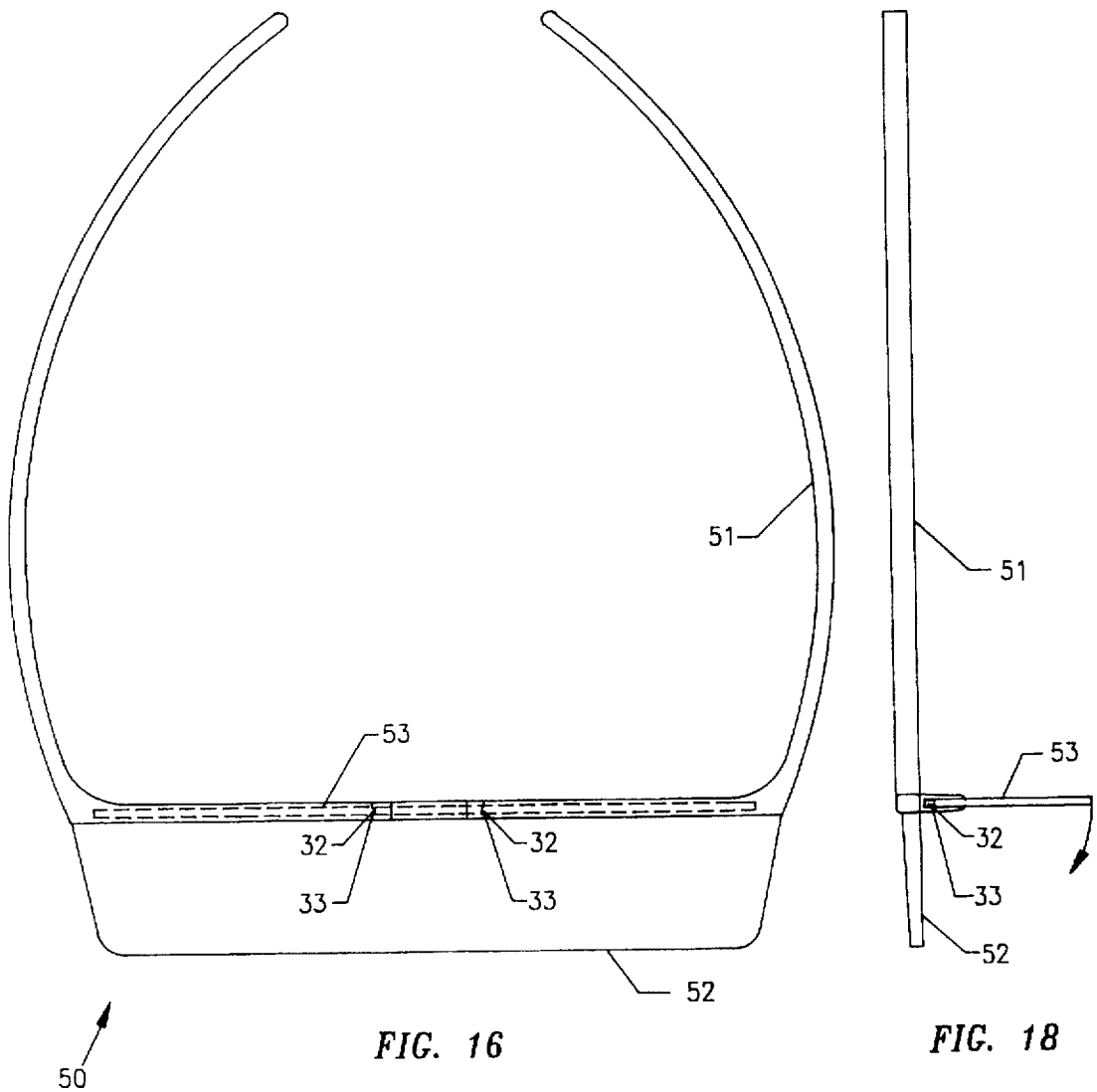
FIG. 16
FIG. 18
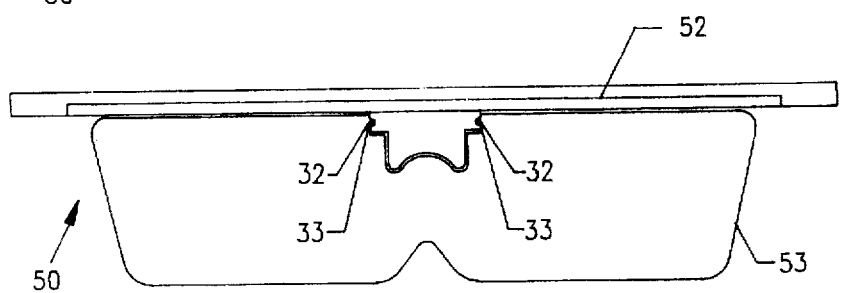
FIG. 17

5,729,321

COMBINED SUNGLASSES AND SUNSHIELD

FIELD OF THE INVENTION

This invention relates to sunglasses and more particularly to a pair of glasses with an eyeshade for protecting eyes against excessive exposure to the sun.

BACKGROUND OF THE INVENTION

Excessive exposure to the sun's rays occurs frequently with sunbathers who lay on their backs or on recliners, facing the intense rays of the sun. Excessive exposure can damage retinas and is believed to be a contributing factor to the development of cataracts. An increased public awareness of the harmful effects of the sun has expanded the use of sun glasses. Current sunglasses provide only limited protection against direct exposure to the intense rays of the sun.

SUMMARY OF THE INVENTION

It is a primary object of the present invention to protect eyes from exposure to the intense rays of the sun. It is a further object to provide an attractive pair of sunglasses which appeal to fashion minded sun bathers, joggers, spectators, and the like. It is a further object to provide a means for personalizing and adding advertising materials to sunglasses.

One feature of a first aspect of the invention is a one piece headband for attaching the sunglasses to a forehead of an individual. An opaque panel and a tinted transparent panel are mounted for rotation on the headband. The opaque and transparent panels are selectively rotatable to vertical positions and to horizontal positions. The opaque sunshade is used for personalizing and/or placing advertising materials on the sunglasses. In a second aspect of the invention, the tinted transparent panel is mounted for rotation on the opaque panel. In a third aspect of the invention, the sunshade and headband are formed from a single piece of material.

Further aspects, objects, benefits and features of the invention will become apparent from the ensuing detailed description and drawings which disclose the invention. The property in which exclusive rights are claimed is set forth in each of the numbered claims at the conclusion of the detailed description.

BRIEF DESCRIPTION OF THE DRAWINGS

The invention will be better understood and further objects, characterizing features, details and advantages thereof will appear more clearly with reference to the diagrammatic drawings illustrating a presently preferred specific embodiment of the invention by way of non-limiting example only.

FIG. 6 is a plan view of an alternate embodiment.

FIG. 7 is a front view of the alternate embodiment.

FIG. 8 is a left side elevational view of the alternate embodiment.

FIG. 9 is an enlarged cross-sectional view taken on the line 9—9 in FIG. 6.

FIG. 13 is a plan view of a third alternate embodiment.

FIG. 14 is a front view of the third alternate embodiment.

FIG. 15 is a left side elevational view of the third alternate embodiment.

FIG. 16 is a plan view of a fourth alternate embodiment.

FIG. 17 is a front view of the fourth alternate embodiment.

FIG. 18 is a left side elevational view of the fourth alternate embodiment.

DETAILED DESCRIPTION OF THE PREFERRED EMBODIMENT

Figures 1, 2, 3, 4, 5:
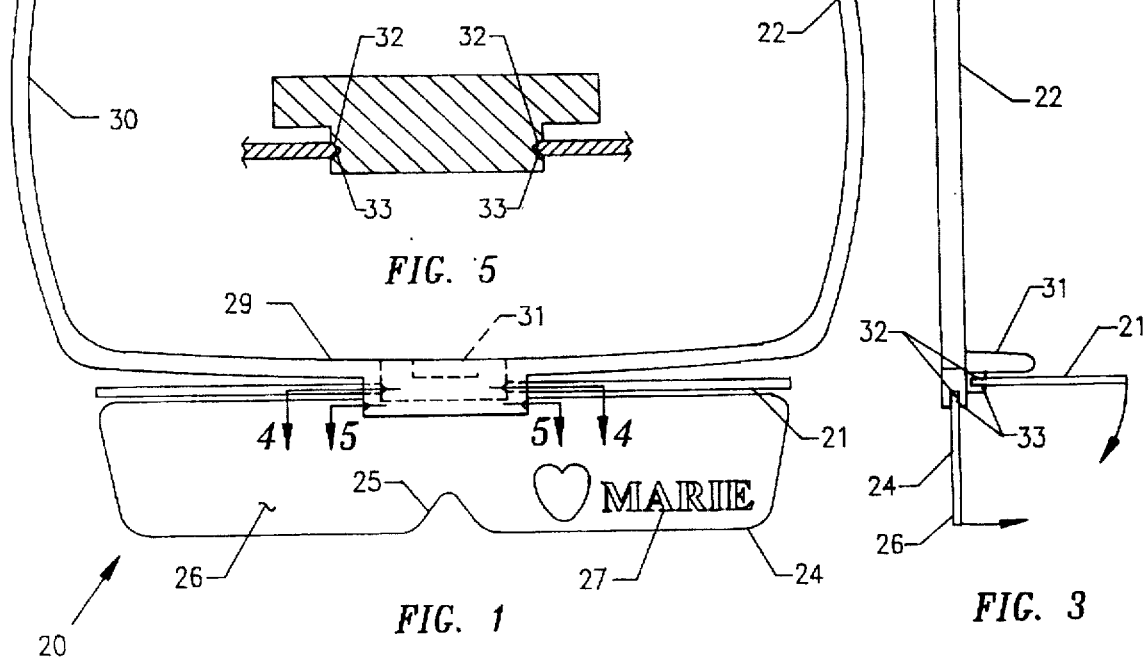
FIG. 1 is a plan view of a pair of sunglasses according to the invention.
FIG. 2 is a front view of the sunglasses.
FIG. 3 is a left side elevational view of the sunglasses.
FIG. 4 is an enlarged cross-sectional view taken on the line 4—4 in FIG. 1.
FIG. 5 is an enlarged cross-sectional view taken on the line 5—5 in FIG. 1.

Referring now to the drawings wherein like numerals designate like and corresponding parts throughout the several views, in FIGS. 1–5, inclusive, a preferred embodiment of a pair of sunglasses 20 is shown for purposes of describing my invention. One characteristic feature of the sunglasses 20 is an opaque rotatable sunshield 24 which is selectively adjustable for partially or totally shielding a user's eyes from intense sunlight. Another characteristic feature is a slender resilient one piece headband 22 for attaching the sunglasses 20 to the forehead of the user.

The sunglasses 20 are broadly comprised of the slender headband 22; a generally rectangular tinted transparent panel 23, extending across the width of the sunglasses 20; and a generally rectangular opaque sunshield 24, extending across the width of the sunglasses 20. The centers of the outer edge portions of the transparent panel 21 and the sunshield 24 have triangular cut-outs 25 for resting the sunglasses 20 on the user's nose. The transparent panel 23 and the opaque sunshield 24 are mounted on the headband 22. When the transparent panel 21 and the opaque sunshield 24 are vertical or horizontal, the opaque sunshield 24 is in covering relationship to the transparent panel 21. As shown in FIG. 1, the opaque sunshield 24 provides a surface for text and graphics 26.

The headband 22 is a generally planar member molded from a single piece of a resilient polymer. The headband 22 has a transverse front portion 29 and a pair of arcuate side portions 30, which extend rearward from opposite ends of the transverse front portion 29. A nose piece 31 extends downwardly from the center of the headband 22 for resting the front of the headband 22 on the user's nose.

With reference to FIGS. 4 and 5, on opposite sides of the nose piece 31 are small circular indentations 32. The circular indentations 32 in the nose piece 31 engage small convex protuberances 33 in the transparent panel 23 and the opaque sunshield 24 to rotatably mount the transparent panel 23 and the sunshield 24 to the headband 22. The transparent panel 23 and the opaque sunshield 24 are attached to the headband 22 by forcibly engaging the protuberances 33 with the indentations 32.

Referring now to FIG. 3, the tinted transparent panel 23 and opaque sunshield 24 are selectively adjustable from vertical positions to horizontal positions to partially or totally block off the sun's rays. The forcible engagement of the protuberances 33 with the depressions 32 provides sufficient friction to retain the tinted transparent panel 23 and opaque sunshield 24 at selected intermediate positions between the horizontal and vertical.

In FIGS. 5-9, an embodiment 34 is shown in which a generally rectangular opaque sunshield 35 is mounted for rotation on a headband 37 and a generally rectangular tinted transparent panel 38 is mounted for rotation on the underside of the opaque sunshield 35. When the opaque sunshield 35 and the tinted transparent panel 38 are rotated to vertical or horizontal positions, the opaque sunshield 35 is in covering relationship to the tinted transparent panel 38.

Figure 10:
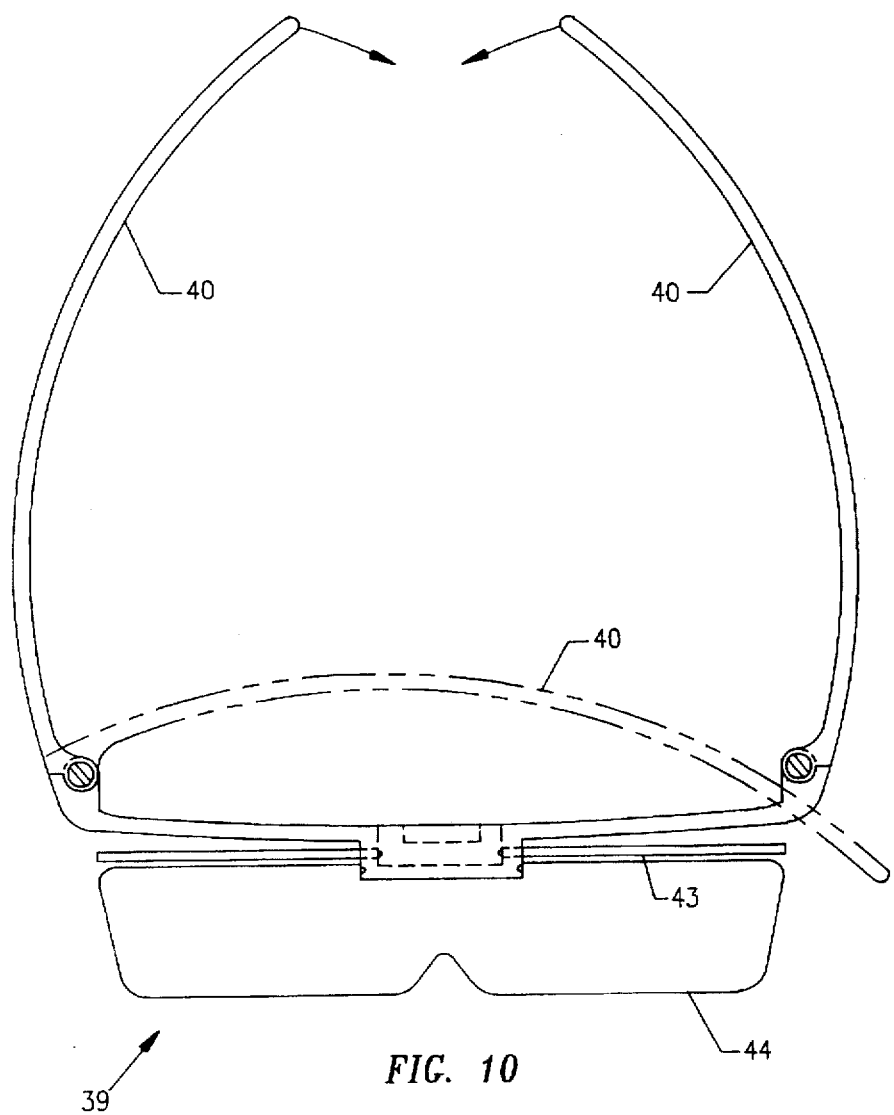
FIG. 10 is a plan view of a second alternate embodiment.
Figure 12:
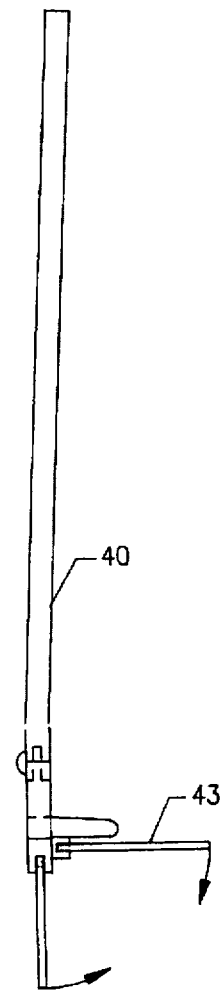
FIG. 12 is a left side elevational view of the second alternate embodiment.
Figure 11:
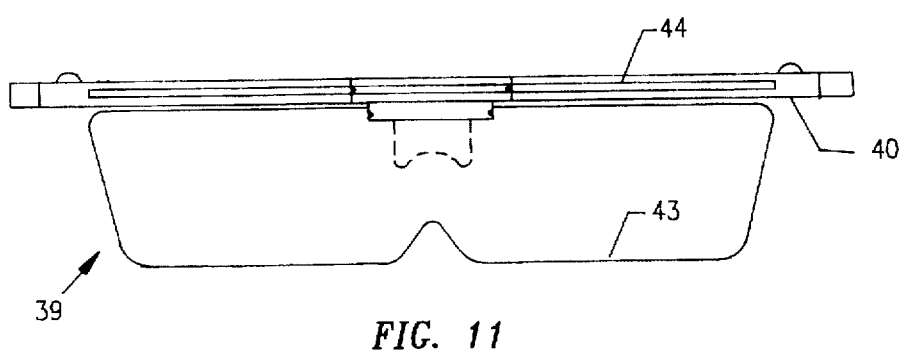
FIG. 11 is a front view of the second alternate embodiment.

In FIGS. 10-12, an embodiment 39 is shown which is similar to the embodiment 20 of FIGS. 1-5, except that a pair of slender arcuate side members 40 are pivotally connected to end portions of a slender transverse member 41. The side members 40 and transverse member 41 form a headband 42 for mounting the sunglasses 20 on a forehead of a user. The side members 40 are rotatable inwardly for storing the sunglasses 39. The rectangular tinted transparent panel 23 and the rectangular opaque sunshield 24 are mounted for rotation on the transverse member 41.

In FIGS. 13-15, inclusive, an embodiment 45 is shown wherein an opaque sunshield 46 and a headband 47 are molded from a single piece of a resilient polymer, such as polypropylene, which is capable of forming a hinge 48. A pair of transverse grooves at the recessed junction of the headband 47 portion with the opaque sunshield portion 46 form the hinge 48. The hinge 48 allows the opaque sunshield 46 to rotate between horizontal and vertical positions. The generally rectangular tinted transparent panel 49 is rotatably mounted to the headband 47 by forcibly engaging the pair of protuberances 33 of the tinted transparent panel 49 with the pair of circular indentations 32 of the headband 47.

In FIGS. 16 through 18 an embodiment 50 is shown wherein a headband 51 and a horizontal non-rotatable opaque sunshield 52 are molded from a single piece of a resilient polymer. The generally rectangular tinted transparent panel 53 is rotatably mounted to the headband 51 by forcibly engaging the pair of protuberances 33 of the tinted transparent panel 53 with the pair of circular indentations 32 of the headband 51. When the transparent tinted panel 53 is horizontal, the opaque sunshield 52 is in covering relationship to the tinted transparent panel 53.

From the foregoing, it will be appreciated that my invention provides an improved pair of sunglasses for reducing eye exposure to the intense rays of the sun. Moreover the appearance of improved pair of sunglasses will appeal to fashion minded sunbathers, joggers, spectators, and the like, and provide a means for personalizing and adding advertising materials.

Although only several embodiments have been illustrated and described, it is not my intention to limit my invention to these embodiments, since changes in material, shape, arrangement of components and substitution of components can be made without departing from the spirit thereof.

I claim:

1. A pair of sunglasses, comprising: a slender horizontal headband formed from a single piece of a resilient plastic material for mounting a pair of sunglasses and an opaque sunshield on a forehead of a user, said headband having a transverse front portion, a pair of adjoining arcuate side portions extending rearwardly from opposite end portions of said front portion, an adjoining nose piece portion extending downwardly from a center portion of said transverse front portion for supporting said headband on said user's nose and a means for mounting a tinted transparent panel and an opaque sunshield; a generally rectangular tinted transparent panel mounted for rotation on said center portion of said headband; and a generally rectangular opaque sunshield mounted for rotation on said center portion of said headband, said opaque sunshield being in covering relationship to said tinted transparent panel when said opaque sunshield and said tinted transparent panel are in vertical or horizontal positions.

2. A pair of sunglasses, comprising: a slender horizontal headband for attaching a pair of sunglasses to a forehead of a user, said headband having a transverse front portion, and a nose piece portion extending downwardly from a center portion of said transverse front portion for resting said transverse front portion of said headband on a nose of said user; a tinted transparent panel extending across said transverse front portion of said headband, said tinted transparent panel mounted for rotation to said headband; and an opaque sunshield, said opaque sunshield extending across said transverse front portion of said headband and mounted for rotation to said headband.

3. The sunglasses recited in claim 2 wherein said tinted transparent panel is a generally rectangular panel.

4. The sunglasses recited in claim 2 wherein said opaque sunshield is a generally rectangular panel.

5. The sunglasses recited in claim 2 further comprising a pair of side members pivotally mounted to end portions of said front portion of said headband.

6. The sunglasses recited in claim 2 wherein said center portion of said headband has a pair of small protuberances and said tinted transparent panel has a pair of small indentations for engaging said protuberances to rotatably attach said tinted transparent panel to said headband.

7. The sunglasses recited in claim 2 wherein said center portion of said headband has a pair of small protuberances and said opaque sunshield has a pair of small indentations for engaging said protuberances to rotatably attach to said headband.

8. The sunglasses recited in claim 2 wherein said opaque sunshield is formed from the same piece as said transverse front portion of said headband.

9. A pair of sunglasses, comprising: a resilient headband formed from a single piece of a resilient plastic material for attaching a pair of sunglasses to a forehead of a user, said headband having a transverse front portion, a pair of adjoining side portions extending rearwardly from opposite ends of said front portion, a nose piece portion extending downwardly from a center portion of said front portion for resting said front portion on a nose of said user, and a means for mounting for rotation said transparent panel; an opaque sunshield, said opaque sunshield extending across said front portion of said headband and mounted for rotation on said headband; and a tinted transparent panel extending across said front portion of said headband, said tinted transparent panel mounted for rotation on said opaque sunshield.

10. A pair of sunglasses, comprising: A headband for attaching a pair of sunglasses and an opaque sunshield to a forehead of a user, said headband having a generally rectangular non-rotatable opaque front portion extending across said front portion of said headband, resilient side portions extending rearwardly from opposite ends of said front portion of said headband, and a nose piece portion extending downwardly from a center portion of said front portion of said headband for resting said front portion on a nose of said user; a tinted transparent panel extending across said sunglasses, and said tinted transparent panel mounted for rotation to said headband, said opaque forward portion of said headband being in covering relationship to said tinted transparent panel when said tinted transparent panel is horizontal.

* * * * *